United States Patent
Hartmann et al.

(10) Patent No.: US 8,197,165 B2
(45) Date of Patent: Jun. 12, 2012

(54) FASTENING DEVICE FOR FASTENING A MOVABLE ELEMENT

(75) Inventors: Andreas Hartmann, Seevetal (DE); Hans-Gerhard Giesa, Berlin (DE); Thomas Rathmann-Ramlow, Ense (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 12/635,249

(22) Filed: Dec. 10, 2009

(65) Prior Publication Data

US 2010/0090429 A1    Apr. 15, 2010

Related U.S. Application Data

(62) Division of application No. 11/270,721, filed on Nov. 8, 2005, now Pat. No. 7,658,577.

(60) Provisional application No. 60/626,050, filed on Nov. 8, 2004.

(30) Foreign Application Priority Data

Nov. 8, 2004 (DE) .......................... 10 2004 053 810

(51) Int. Cl.
*B60P 7/08* (2006.01)

(52) U.S. Cl. ........................... 410/66; 410/100; 410/120

(58) Field of Classification Search .................... 410/12, 410/66, 100, 103, 120; 254/214; 244/118.1; 248/499
See application file for complete search history.

(56) References Cited

U.S. PATENT DOCUMENTS 3,751,101 A * 8/1973 Miller et al.
7,658,577 B2 * 2/2010 Hartmann et al. .............. 410/66

* cited by examiner

*Primary Examiner* — Stephen Gordon
(74) *Attorney, Agent, or Firm* — Christopher Paradies; Fowler White Boggs P.A.

(57) ABSTRACT

A fastening device for fastening a movable element to a structure includes a support member and at least one belt retractor having a retractable belt and a fitting. The belt retractor may be fastened to a support member. The belt retractor is arranged in such a way that, if the fitting couples the structure and the movable element, the retractor prevents unrolling of the belt by more than a predefinable range if an external force, such as sudden mid-air turbulence acts on the movable element. Thus, the movable element is secured.

10 Claims, 5 Drawing Sheets

FASTENING DEVICE FOR FASTENING A MOVABLE ELEMENT

RELATED APPLICATIONS

This application is a divisional application of U.S. application Ser. No. 11/270,721, filed Nov. 8, 2005 U.S. Pat. No. 7,658,577, which claims the benefit of the filing date of U.S. Provisional Patent Application No. 60/626,050 filed Nov. 8, 2004, and German Patent Application No. 10 2004 053 810.7, filed Nov. 8, 2004 the disclosures of which are hereby incorporated herein by reference.

FIELD OF THE INVENTION

The field relates to a fastening device, a method of manufacturing a fastening device, and a use of a fastening device for fastening a trolley.

TECHNOLOGICAL BACKGROUND

Securing a trolley or serving cart used in a cabin of an aircraft, particularly in the event of turbulence during flight operation, is important in order to ensure a sufficiently high degree of security and safety for passengers in a passenger aircraft.

According to the related art, in the event of expected turbulence, one attempts to stow trolleys in a timely manner in a galley (onboard kitchen) and lock them there. However, this is difficult in the event of unexpected turbulence.

In order to secure a trolley in the cabin, "trolley tiedown fittings" which have bolts onto which a trolley equipped with a corresponding counterpart may be pushed and thus secured. In another alternative, "trolley parking systems," a trolley is secured by using pivot arms and rocker arms fastened to a monument wall.

For securing to monument walls or bulkhead walls, simple belt systems in which a trolley may be lashed to the wall may be utilized, (for example, a lavatory.)

A securing system installed in a trolley, which is based on a restraint mechanism activated by a gravitational transmitter, is described in US 2002/0014556A1. A bolt integrated into the trolley is thus used as the restraint mechanism, which may extend under the passenger seat on the aisle upon activation. A vacuum suction system, in which the trolley is suctioned onto the cabin floor after activation, is disclosed as an alternative restraint mechanism in US 2002/0014556A1.

Another suction system is described in U.S. Pat. No. 3,823,900. There the trolley is suctioned on by valves integrated into the armrests of the passenger seats on the cabin aisle, which are connected to a vacuum system.

WO 01/15973 discloses the securing of a trolley through a rail along a cabin aisle. For this purpose, lowerable skids are attached to the trolley at the front and rear, which are inserted into the rail to secure the trolley. However, the known solutions for fastening a trolley have an array of disadvantages.

With the known solutions, trolleys are fastened at additional locations outside the galley (onboard kitchen). The locations usable for this purpose within the cabin are in the area of the doors, lavatories, and the trolley lifts. In order to secure a trolley, it must first be pushed to a place provided for this purpose. In the event of unexpected strong turbulence (such as "clear air turbulence"), this may prove inadequate.

Modifications of the trolley are made to accommodate the "trolley tiedown fittings". Significant modifications of the trolley and/or the passenger seats are required for devices disclosed in the references. The necessity of modifying the trolley represents a significant disadvantage, since the trolleys may only be exchanged between different aircraft in a very restricted way. The modifications of the passenger seats described in U.S. Pat. No. 3,823,900 and the necessity of integrating a suction system are technically complex and susceptible to breakdown.

Additionally, the "trolley parking system" is currently only suitable for half-size trolleys, not for full-size trolleys.

SUMMARY OF THE INVENTION

A fastening device, a method for manufacturing a fastening device, and of a fastening device provide improved ways to secure a trolley, such as a cart containing food or beverage, in an airplane during flight.

A fastening device for fastening a movable element to a structure may include a support member and a first belt retractor having a retractable belt and having a fitting. The movable element may be a trolley, for example. The structure may be a passenger seat, for example. The first belt retractor is fastened to the support member. The first belt retractor may be arranged such that when the fitting is coupled to a structure or to a movable element separately in order to couple the movable element and the structure together, the first belt retractor prevents unrolling of the belt by more than a predefinable range if an external force acts on the movable element.

In a method for manufacturing a fastening device for fastening a movable element to a structure, a first belt retractor of the fastening device is fastened to a support member of the fastening device in the method. Furthermore, a fitting of the first belt retractor is attached to a retractable belt of the first belt retractor. The first belt retractor is set up in such a way that, when the fitting couples a fixed structure and the movable element, the retractro prevents unrolling of the belt by more than a predefinable range, if an external force acts on the movable element, such as during sudden air turbulence. A fastening device having the features described above may be used for fastening a trolley when air turbulence is expected, for example.

A belt retractor having a retractable belt may be fastened to a support member/support structure, such as a rigid support bar, wherein the support bar may be dimensioned and designed in such a way that it may be placed on a trolley to be fastened. The belt of the belt retractor may then be unrolled, such that a fitting of the belt retractor may be fastened to a corresponding fitting on the wall of an aircraft, for example. Alternatively, the support member having the belt retractor may be provided on a structure or attached thereto, for example, to the inner wall of an aircraft cabin. The fitting of the fastening device may then be fixed with a corresponding fitting on the movable element, such as a trolley. If an external force acts on the fastening device, for example, in the event of turbulence during flight operation, the belt retractor may suppress the unrolling of the belt by more than a predefinable range and thus may prevent the movable element from moving undesirably and/or being decoupled from the structure during the action of such an external force. The predefinable range may be any range that safely prevents the trolley from endangering passengers or crew. The safety of passengers and of aircraft personnel during flight may thus be significantly increased and a danger of injury due to inadequately secured trolleys is avoided.

This system using the features of the fastening device may be termed as the flexible trolley restraint system. The flexible trolley restraint system may be used even within the longitudinal aisles of an aircraft cabin (for example, during the service), without it being necessary to cover large distances with the trolley. It may be therefore suitable for preventively securing trolleys at the positions provided for this purpose even in the event of suddenly occurring turbulence and/or during the service.

For example, the flexible trolley restraint system may be an attachable/removable attachment (or a device to be installed on a structure), so that a permanent connection to a trolley or another movable element may not be necessary. Therefore, no modification of conventional trolleys (such as Atlas, KSSU) need not be necessary for application. In an embodiment in which the fastening device is attached to the structure, only a fitting may be provided on the trolley, which is coupled to the fitting on the belt of the fastening device.

The flexible trolley restraint system may be suitable both for half-size trolleys and also full-size trolleys, since the support member may be placed both on a half-size trolley and also on a full-size trolley.

For example, the flexible trolley restraint system may be used for securing a trolley during a serving procedure, for example, from undesired acceleration in the vertical direction, which may be initiated by turbulence or a sudden flight maneuver.

The flexible trolley restraint system may also be used for securing excess trolleys on the passenger deck (for example, in underfloor galleys) by providing additional fastening points in the cabin.

The flexible trolley restraint system may include a flat connection part, which is curved at the edges for protection from lateral slipping, to which two belt retractors are fastened. These may each be unrolled within a predefinable range. The fastening to the connection part may be performed at the edge of the connection part. Alternatively, the belt retractors may be fastened further toward the middle of the connection part or laterally at the curved edges.

Fastening fittings may be attached to the belt, which may allow a connection to the fittings incorporated in the aircraft cabin. The fittings may be attached at the end of the belt. They may also be attached to and/or on the belt (at any arbitrary point). Multiple fittings may be attached to a belt, for example, to the end of the belt and on the belt. Through a biasing mechanism such as a spring, the belt may be retracted into the belt retractor automatically up to a predefined maximum length, such that the belt may always be automatically tensioned in the fastened state. As long as no force acts on the belt, it may be unrolled flexibly. As soon as an acceleration of the trolley having force components acting vertically upward occurs, the belt may automatically be locked against unrolling further, for example, by the use of a centrifugal clutch, and may prevent vertical acceleration of the trolley in this way. Optionally, a mechanism for manually fixing the belt may also be provided. The roller belts used may be conventional belt systems.

The flexible trolley restraint system may be placed on the trolley and may be secured from slipping in the longitudinal direction at the contact points via a damping material having high static friction (such as rubber or silicone) or through frictional connection, for example, through a suitable clamping device. The belts may be hooked onto the lower edge of the trolley. However, these or other fastenings on the trolley are not absolutely necessary.

The fastening possibilities of the flexible restraint system in the cabin may be located at greatly varying locations depending on application. For example, such fastening possibilities may be provided at the aisle-side fastening points of lap belts for the passengers (an additional fitting may be provided here), on the seat rails, proximal to the aisle, between the passenger seats (standardized fastening fittings are often provided here), on vertical walls of cabin installations (hook fittings are frequently provided at a height of approximately 20", i.e., approximately 508 mm), or in the door areas and in the surroundings of the trolley lift (standardized fittings are frequently provided here on the floor).

By using the flexible restraint system, trolleys may be secured from undesired upward vertical accelerations at significantly more locations in an aircraft cabin than previously known solutions. In particular, the system of securing conventional trolleys within the longitudinal aisles of the cabin (for example, during the service), without the need for retrofitting on the trolley for this purpose, may represent a decisive advantage.

The flexible restraint system may be suited for all typical trolleys (KSSU, Atlas) in both standard sizes (half-size trolleys and full-size trolleys).

The trolley fastening system may be actuated by a person without special exertion of force.

The flexibility of the restraint system due to the flexible belts may have the advantage that even a secured trolley may be moved in a restricted range, for example, in order to let passengers by. Easy replacement of the system for maintenance may be allowed as the system does not require a specific trolley type.

In one example, the first belt retractor may be arranged in such a way that, when the support member is placed, plugged, or clamped on the movable element and the fitting is fastened to a structure, to which the movable element is to be coupled to, the first belt retractor prevents unrolling of the belt by more than a predefinable range if an external force acts on the movable element. The fastening device may be placed on the trolley and the fitting on the belt is coupled to a corresponding fitting, for example, on an aircraft cabin wall.

Alternatively, the first belt retractor may be set up in such a way that, if the support member is fastened to a structure and the fitting is placed on a movable element, the first belt retractor prevents unrolling of the belt by more than a predefinable range if an external force acts on the movable element. The fastening device may be fastened to an aircraft cabin wall or to a passenger seat, for example. The fitting on the belt is then fastened with a corresponding fitting on the movable element, such as a trolley.

The support member may be a support bar. Alternatively, the support member may have a clamping mechanism or a plug-in mechanism, through which the fastening device may be clamped and/or plugged on a movable element.

The fitting may be attached to an end section of the retractable belt. Alternatively, the fitting may also be provided in the middle or at any other arbitrary point of the belt.

Multiple fittings may be provided on the fastening device, and are attached to different points of the retractable belt, for example, at one end and at one point between the end and a roller for retracting the belt.

In the fastening device, a second belt retractor having a retractable belt and having a fitting may also be provided. The second belt retractor may be fastened to the support member. Although one single belt retractor on the support structure may be used, the stability and therefore the quality of the fastening may be significantly improved if a second belt retractor is provided, since a trolley would be fastened to the surroundings using two fastening points. The stability may thus be significantly increased.

Alternatively, the fastening device may have an additional support member, with the second belt retractor being able to be fastened to this additional support member. In other words, different belt retractors of the fastening device may be attached to different support members. Multiple support members may be coupled to one another by attachment means such as a cable, for example.

In another example, the first belt retractor may be fastened to a first end section of the support member, and the second belt retractor may be fastened to a second end section of the support member. This geometric configuration may result in an especially advantageous force distribution upon fastening of the movable element and thus may further increase the stability of the fastening device.

Alternatively, the first belt retractor may be fastened at a first distance from a first end section of the support member, and the second belt retractor may be fastened at a second distance from a second end section of the support member. The first distance and the second distance are preferably different from zero, such that the belt retractors are positioned closer to one another.

The support member may be any rigid member, such as a member which is shaped one-dimensionally like a rod or two-dimensionally like a flattened bar, having a width, a thickness and a length (i.e., as a plane connection structure), for example. Other geometric shapes for the support member may also be used. The support member may be placed on the movable element, particularly on a trolley, to achieve a secure connection.

The support member of the fastening device may have a curved section on a first end section, and the support member may have a curved section on a second end section. By providing the end sections of the support member in a curved way, the ends may readily conform to the geometry of a movable element (such as a trolley) and lateral slipping of the support structure from the movable element may be avoided by the laterally curved section.

The first belt retractor may be fastened to the curved section of the first end section of the support member, and the second belt retractor may be fastened to a curved section of the second end section of the support member. With such a geometry, the force conditions acting on the fastening device may be favorable.

A separate support member (such as a support bar) or a similar fastening part for every belt retractor may be used. Support members which are placed and/or clamped on an edge of the trolley may also be used.

In another example, the fastening device may include at least one additional belt retractor having a retractable belt and having a fitting, wherein the at least one additional belt retractor may be fastened to the support member. For example, a total of three belt retractors or four belt retractors, or even a higher number of belt retractors may be fastened to fastening points on different sides. Stability may be better if more belt retractors are provided. If a rather low number of belt retractors is provided, rapid installation and uninstallation of the fastening device and cost-effective manufacturing of the fastening device may instead be achieved.

The first belt retractor may have a biasing mechanism such as a spring, which is arranged in such a way that it pulls in the belt up to a predefinable length to tension the belt. If the fitting of the belt retractor is fastened to a corresponding fitting of a structure, the spring mechanism, in one example, may cause the belt to be pulled up to a predefinable length, under which the belt is automatically tensioned. A secure fastening of the movable element to the structure using the fastening device may thus be achieved.

The first belt retractor may be arranged in such a way that, if the fitting is coupled to a structure or to a movable element, it prevents unrolling of the belt by more than a predefinable range if an external force having a force component perpendicular to the support member acts on the movable element. Therefore, the fastening device may advantageously be used in an aircraft in particular, since vertical force components frequently may arise there in case of turbulence, which may be effectively prevented from lifting the movable element (such as a trolley or a serving cart) from the aircraft floor in an undesired way if the fastening device is used.

The first belt retractor may have a centrifugal clutch, which is arranged in such a way that, if the fitting is coupled to a structure or to a movable element, it prevents unrolling of the belt by more than a predefinable range if an external force acts on the movable element. For example, a clutch in which weights are displaced as the effect of force increases, may be considered a centrifugal clutch. By using such a centrifugal clutch, the belt is automatically blocked against unrolling further such that in this way vertical acceleration of the trolley is avoided.

The fastening device may have a mechanism for manually fixing the belt. A user may thus control the belt flexibly, rapidly, and without using an automatic device, for example, in a dangerous situation.

The support member may have a damping material, such as foam, in a surface area, which is intended to be placed in contact with the movable element. Using such a damping material, damage to the trolley and the fastening device may be avoided.

The support member of the fastening device may have an anti-slip material in a surface area, which is intended to be placed on the movable element, particularly those that contain a material having a high static friction. A rubber coating, for example, may avoid slipping of the movable element in relation to the fastening device and thus may increase the stability of the fastening. In one example, the material is both anti-slip and damping.

The support member and/or the support bar may also have a clamping mechanism in order to secure the trolley against slipping. For this purpose, for example, a support bar including two parts may be used and may be clamped on the trolley using cables, wires, rods, or springs, for example.

In one example, the trolley may be fastened to a structure in an aircraft. An aircraft is an especially critical environment in regard to suddenly occurring force. (for example, in case of turbulence).

The structure may, for example, be selected from the group consisting of a fitting on a passenger seat, a fitting on a wall, and a fitting on the floor of the aircraft. The fastening device may be fastened to any arbitrary structure in the interior of an aircraft with an appropriate fitting corresponding to the fitting of the fastening device.

BRIEF DESCRIPTION OF THE DRAWINGS

Several examples of the present invention are illustrated in the figures and are described in the detailed description. Identical or similar components in different figures are provided with identical reference signs.

DETAILED DESCRIPTION OF PREFERRED EMBODIMENTS

Figure 1:
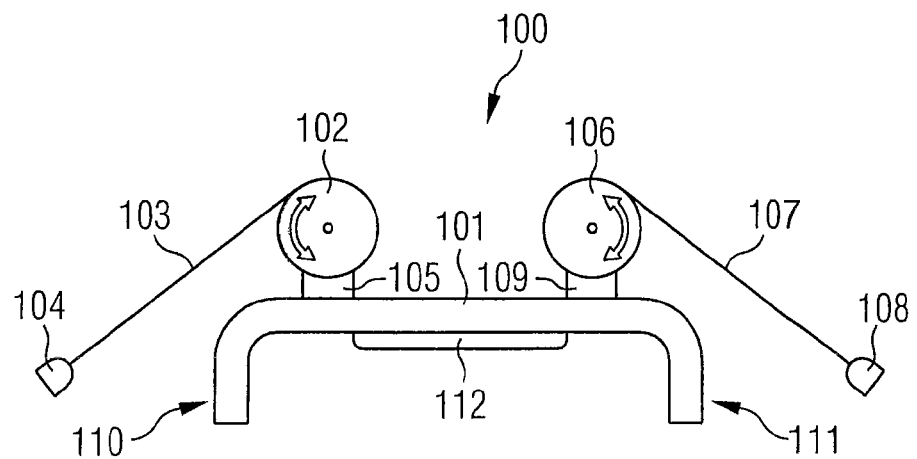
FIG. 1 shows a fastening device.

In FIG. 1, the fastening device 100 may fasten a trolley to a wall of an aircraft. The fastening device 100 comprises a support bar 101, a first belt retractor 102, and a second belt retractor 106. The first belt retractor 102 includes a retractable belt 103 and a fitting 104. The second belt retractor 106 contains a retractable belt 107 and a fitting 108. The first belt retractor 102 is coupled using a first connection part 105 to the steel support bar 101. The second belt retractor 106 is coupled using a second connection part 109 to the support bar 101. The fitting 104 is attached to an end section of the retractable belt 103, and the fitting 108 is attached to an end section of the retractable belt 107.

Each of the two belt retractors 102, 106 may be arranged such that if the support bar 101 is placed on a trolley to be fastened (not shown) and the fittings 104 and/or 108 are fastened to a wall in an aircraft, to which the trolley is to be fastened, they prevent unrolling of the belt 103, 107 by more than a predefinable range if a vertical force (according to FIG. 1) acts on a trolley. The first belt retractor 102 is fastened to a first end section of the support bar 101, while the second belt retractor 106 is fastened to a second end section of the support bar 101.

The support bar 101 may be a rigid, flattened oblong body and has a curved section 110 on a first end section, and a second curved section 111 on a second end section of the support bar 101. However, any geometric shape for the support bar may be utilized. The curved sections 110, 111 are shaped and dimensioned in such a way that a trolley may be inserted into the U-shaped cavity in the lower area of the fastening device 100. In one example, the U-shaped cavity is defined by the support bar 101 with the curved sections 110, 111. In other words, the fastening device 100 may be placed on a trolley in such a way that it not only contacts the trolley along the main extension direction of the support bar 101, but rather also abuts the trolley on the left and right end sections (i.e., on the curved sections 110, 111) to avoid slipping.

The belt retractors 102, 106 each have a biasing mechanism, which is set up in such a way that it pulls in the particular belt 103, 107 up to a predefinable length to tension the belt 103 and/or 107. In one example, the biasing mechanism is a spring. A centrifugal clutch in each of the belt retractors 102, 106 ensures unrolling of the belts 103, 107 by more than a predefinable range if an external force acts on a trolley.

The support bar 101 may include a porous rubber coating 112 as an anti-slip and damping material in a surface area in contact with the trolley.

The fastening device 100 is placed on the top of a trolley (not shown in FIG. 1). The belts 103, 107 are then pulled out, and the fittings 104, 108 are fastened to corresponding fittings on passenger seats and a passenger area of an aircraft. The biasing mechanism in the interior of the belt retractors 102, 106 then ensures that the belts are tensioned and that the fastening device 100 is seated securely on the trolley to be fastened. If a vertical force (for example, because of turbulence during flight operation) acts on the trolley, the trolley is protected from undesired movement because of the centrifugal clutch and the mode of operation of the belt retractors 102, 106.

Figure 2:
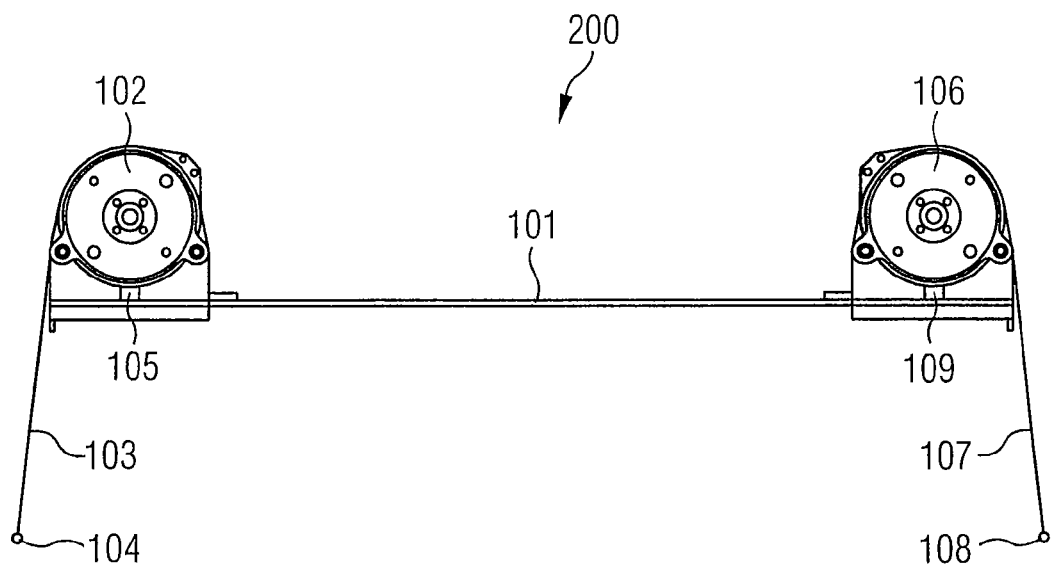
FIG. 2 shows a fastening device according to one embodiment of the present invention.

In FIG. 2, a fastening device 200 is depicted. The detailed structure of the belt retractors 102, 106 of the fastening device 200 is known in the art.

Figure 3:
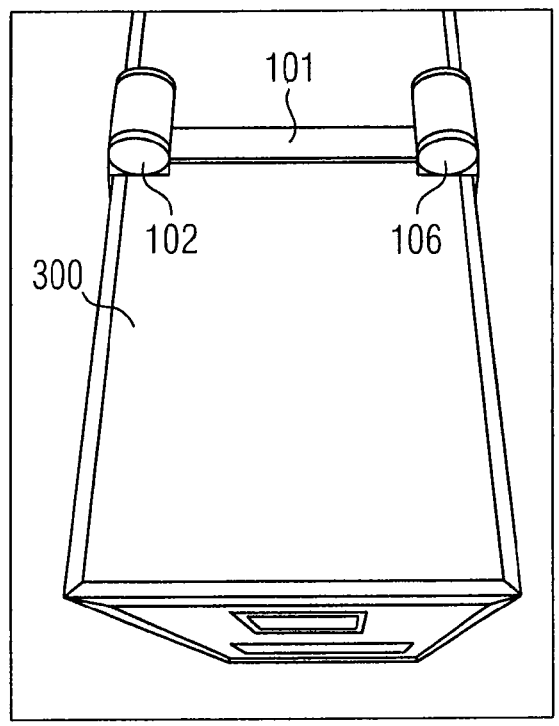
FIG. 3 through FIG. 5 show different views of fastening devices.
Figure 4:
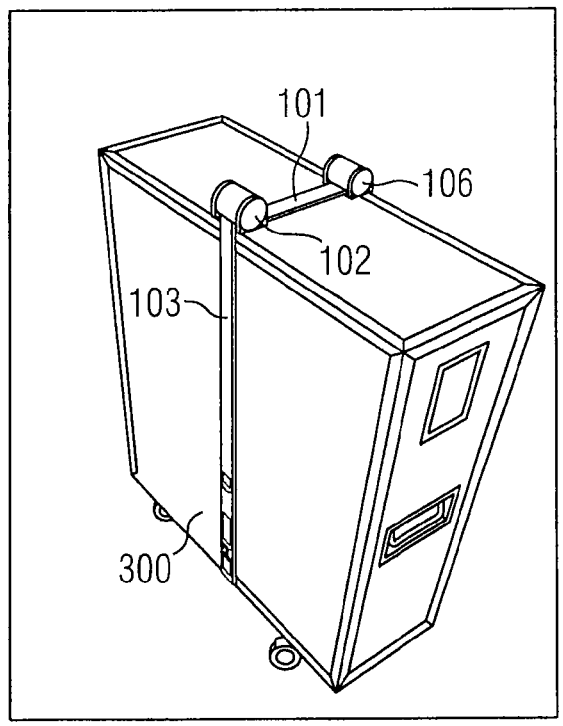
Figure 5:
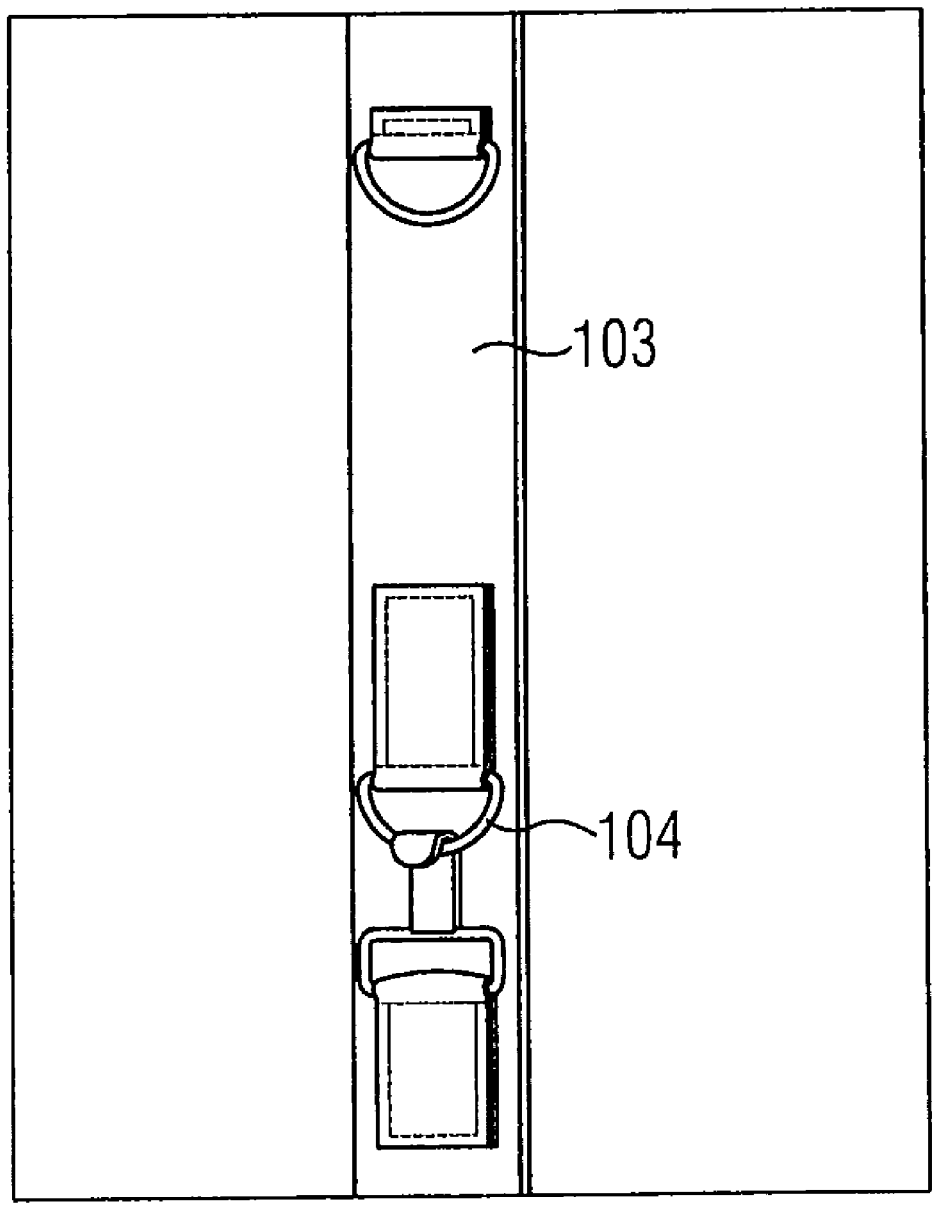

Perspective views of a fastening device trolley 300, which is fastened in the interior of an aircraft using the fastening device are depicted in FIGS. 3 through FIG. 5.

Figure 6:
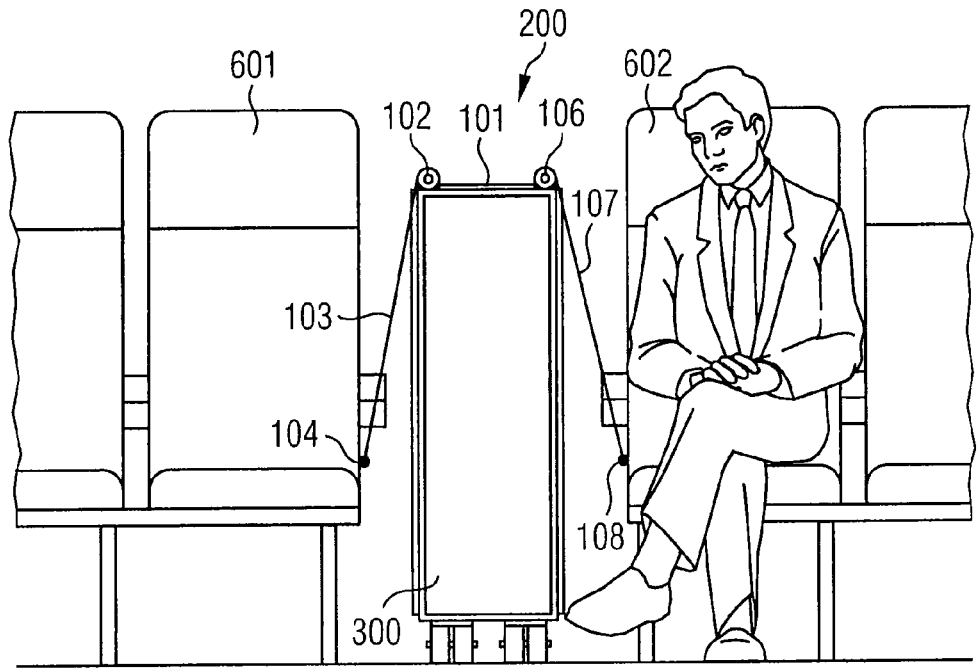
FIG. 6 shows a first view of a fastening device according to one embodiment.
Figure 7:
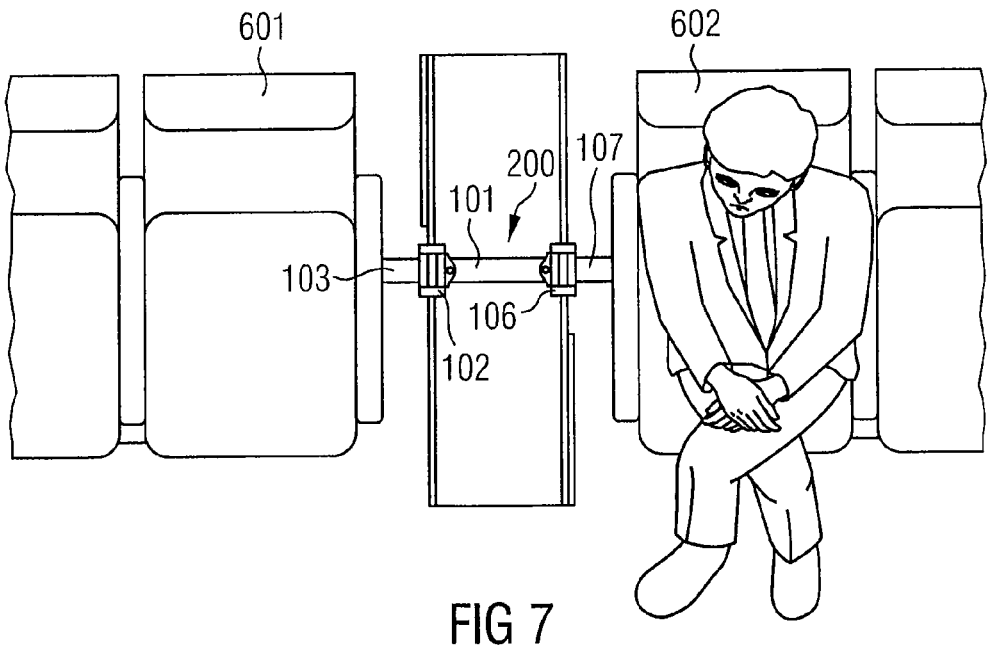
FIG. 7 shows a second view of the fastening device of FIG. 6.

In FIG. 6, one view of the fastening device 200 is depicted. FIG. 7 shows another view of this system. In the fastening device 200, the fittings 104, 108 are fastened to corresponding fittings on a first passenger seat 601 and/or on a second passenger seat 602. More precisely, the fittings 104, 108 are attached to aisle-side fastening points of the passenger seats 601, 602 (additional fittings, not shown, may be provided).

Figure 8:
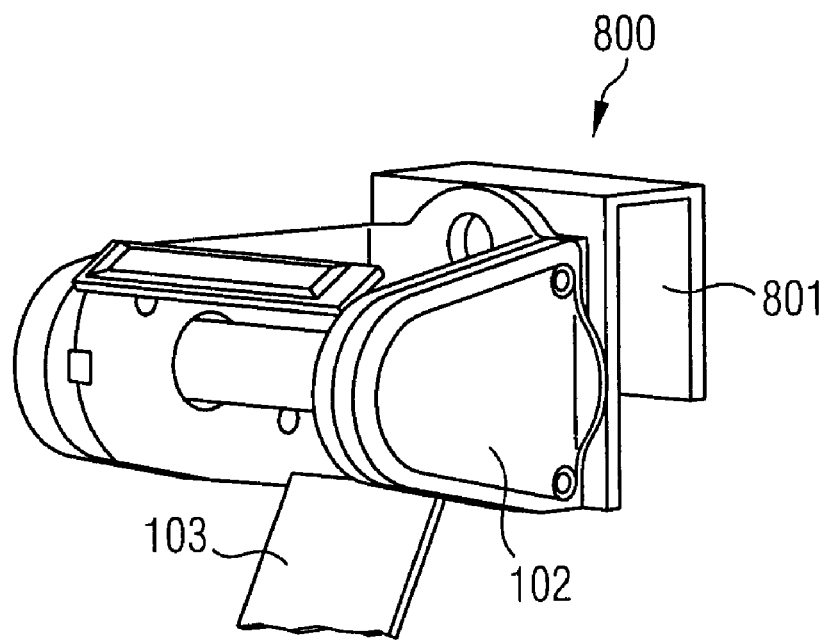
FIG. 8 shows another embodiment of a fastening device.

In FIG. 8, a fastening device 8 may include only one single belt retractor 102 having a belt 103 and having a fitting (not shown in FIG. 8) for fastening to a corresponding fitting on a passenger seat of an aircraft. A support member 801 may have a U-shaped profile or cross section, such that it is attachable on a trolley to be fastened.

Figure 9:
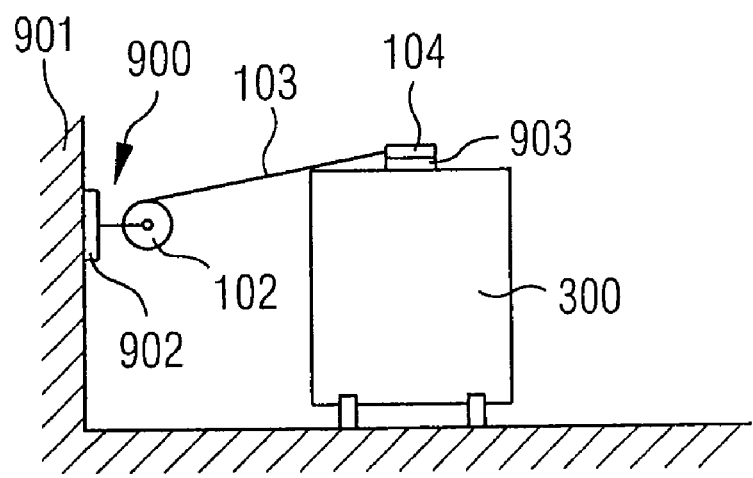
FIG. 9 shows another embodiment of a fastening device.

In FIG. 9, a fastening device 900 for fastening a trolley 300 to an aircraft cabin inner wall 901 may be fastened to the aircraft cabin inner wall 901 (in one example, by screws) and includes a support member 902 and a belt retractor 102 having a retractable belt 103 and having a fitting 104. The belt retractor 102 is fastened to the support member 902. The belt retractor 102 may be arranged in such a way that, if the fitting 104 is coupled to a fitting 903 of a trolley 300, the retractor prevents unrolling of the belt 103 by more than a predefinable range if an external force acts on the trolley 300. The fittings couple the trolley 300 to the aircraft cabin inner wall 901. In this example, the trolley 300 may have only one fitting 903.

The fastening device 900 is attached to the aircraft cabin inner wall 901 as a structure. The fittings 104 and 903 are fastened to one another in order to fasten the trolley 300 to the aircraft cabin inner wall 901.

Implementation of the present invention is not limited to the embodiments illustrated by the drawings and described as examples in the specification. Instead, many variations may be made to the examples that will nonetheless be within the scope of the claims.

LIST OF REFERENCE SIGNS

100 FASTENING DEVICE
101 support bar
102 first belt retractor
103 retractable belt
104 fitting
105 connection part
106 second belt retractor
107 retractable belt
108 fitting
109 connection part
110 first curved section
111 second curved section
112 rubber coating
200 fastening device
300 trolley
601 first passenger seat
602 second passenger seat
800 fastening device
801 pluggable support member
900 fastening device
901 aircraft cabin inner wall
902 support member
903 fitting

What is claimed is:

1. A fastening device for fastening a movable element in a cabin of an aircraft in the event of turbulence during flight to a structure of the aircraft, the fastening device comprising:

a first support element; and a first belt retractor having a retractable belt and a first fitting, the first belt being capable of unrolling from the first belt retractor during normal use of the movable element;

the first belt retractor being coupled to the first support element such that when the first support element and the first belt retractor couple the movable element to the structure of the aircraft by positively placing, plugging or clamping the first support element on the movable element and fastening the first fitting to the structure of the aircraft by attaching the first fitting to a first portion of the structure of the aircraft and when turbulence exerts an external force, having a force component acting vertically, acts on the aircraft, such that the first support element could be moved upward in relation to the structure of the aircraft, then the first belt retractor prevents unrolling of the belt by more than a predefinable range wherein the first support element has a u-shaped profile attachable to the movable element.

2. The fastening device of claim 1, further comprising:

a second belt retractor having a retractable belt and having a second fitting.

3. The fastening device of claim 1, wherein the first fitting is attached to an end section of the first retractable belt.

4. The fastening device of claim 1, wherein the first support element is a rigid, flattened oblong body.

5. The fastening device of claim 1, wherein the first belt retractor comprises a biasing mechanism, such that the first belt retractor applies tension to the first retractable belt.

6. The fastening device of claim 5, wherein the biasing mechanism is a spring.

7. The fastening device of claim 1, wherein the first belt retractor comprises a centrifugal clutch, and the centrifugal clutch is capable of preventing unrolling of the first retractable belt by more than a predefinable range if the external force acts on the aircraft.

8. The fastening device of claim 1, wherein the first belt retractor comprises a mechanism for manually fixing the first retractable belt.

9. The fastening device of claim 1, wherein the first support element comprises a damping material on a contact surface area.

10. A system comprising a trolley as a movable element within a cabin of an aircraft; a structure of the aircraft within the cabin of the aircraft; the fastening device of claim 1, wherein the first fitting of the belt retractor is fastened to the structure of the aircraft, the belt retractor is coupled to the trolley by the first support element, and the trolley is fastened to the structure in the cabin of the aircraft in the event of turbulence during flight.

* * * * *